July 15, 1941.   F. L. DARLING   2,248,969
METHOD OF MAKING HOSE CLAMPS
Filed June 9, 1939
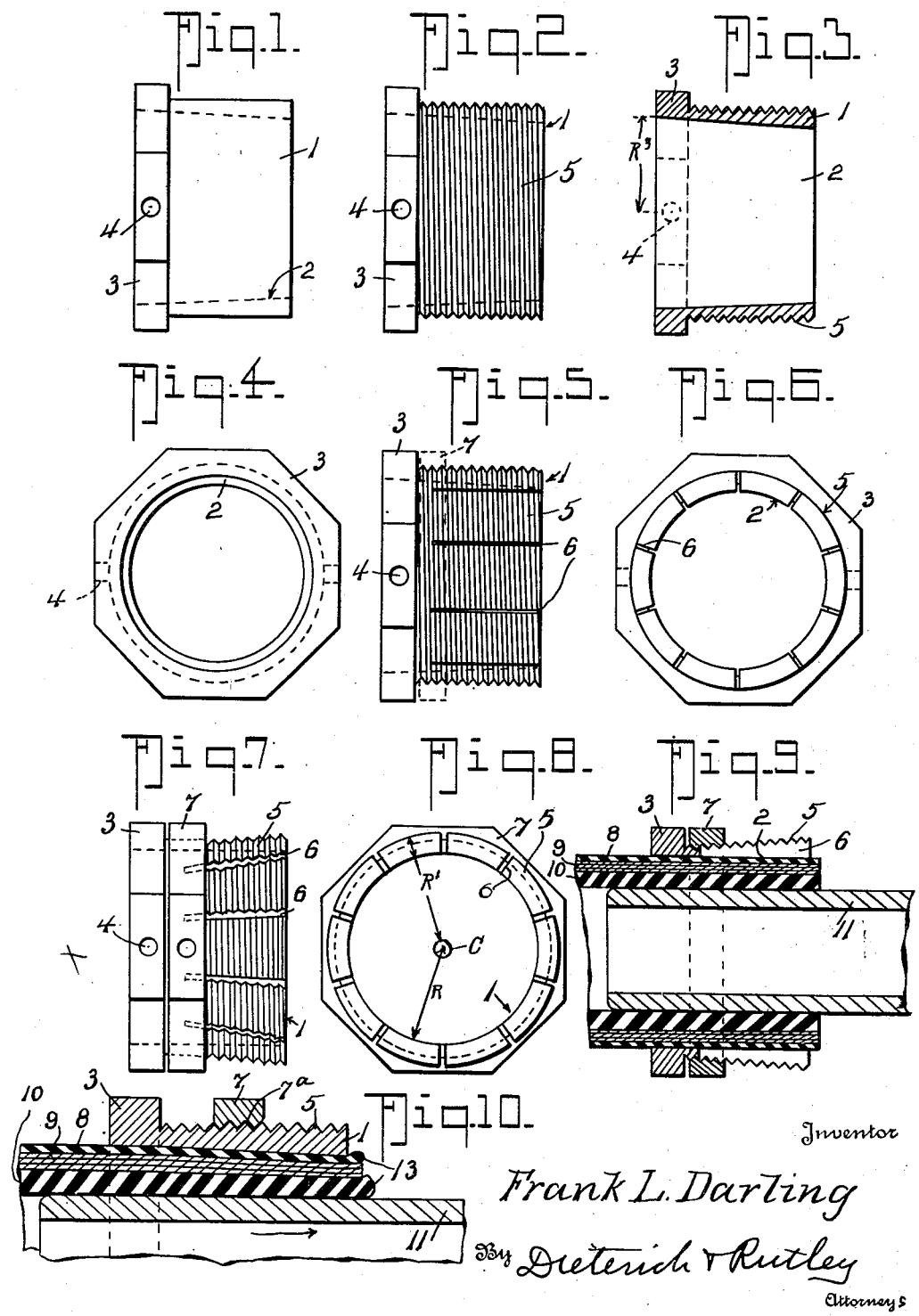
Inventor
Frank L. Darling
By Dieterich & Rutley
Attorneys Patented July 15, 1941

2,248,969

UNITED STATES PATENT OFFICE 2,248,969

METHOD OF MAKING HOSE CLAMPS

Frank L. Darling, Hollywood, Calif., assignor to Wingfoot Corporation, Wilmington, Del., a corporation of Delaware Application June 9, 1939, Serial No. 278,357

1 Claim. (Cl. 29—156)

My invention relates to a new method of making a certain new and improved device for securing flexible hose to metal pipes, nipples, etc., and it has for its particular objects to provide a means which will securely hold the hose on the pipe with equal pressure or squeeze over the entire circumference.

The device has been particularly devised for use in securing the rubber hose used on airplanes to the pipes or nipples and especially is it useful to secure the oil lines that lead to the motor lubricating ducts, as, for instance, the ducts for valve lubrication. Heretofore all hose clamps that have been used on airplanes have been found unsafe, in that they break, become loose, or do not apply uniform squeeze or sealing pressure around the hose, with the result that leaks occur, or the connection becomes loose and separates, often resulting in fire which endangers the lives of the passengers.

My invention has been devised to overcome and does overcome the objectionable features of all hose clamps heretofore used in airplane and airplane motor construction.

Other objects will in part be obvious and in part be pointed out hereinafter.

To the attainment of the aforesaid objects and ends the invention still further resides in those novel features of construction, combination and arrangement of parts, all of which will be first fully described in the following detailed description and then be particularly pointed out in the appended claim, reference being had to the accompanying drawing, in which:

Fig. 1 is a side elevation of a blank, formed as the first step in the process of manufacture.

Fig. 2 is a side elevation of the blank after the thread has been cut.

Fig. 3 is a vertical section of the same.

Fig. 4 is an end elevation looking from left to right in Figs. 1, 2 and 5.

Fig. 5 is a side elevation after the third step in the manufacturing process has been completed. (The fourth step is indicated in dotted lines, i. e., placement of the nut.)

Fig. 6 is an end elevation of Fig. 5, looking from right to left.

Fig. 7 is a side elevation of the device in its final stage of manufacture, ready for use.

Fig. 8 is an end elevation, looking from right to left of Fig. 7.

Fig. 9 shows the device in place for coupling a hose to a pipe or nipple and before the nut is screwed forward to effect the clamping action.

Fig. 10 is an enlarged detail section showing the nut screwed forward to apply the clamping (squeezing) pressure.

In the drawing, in which like numerals of reference indicate like parts in all the figures, 1 is the body of the tubular blank having an outer cylindrical face and a shoulder 3 which is preferably formed as a nut-like member, and/or it may merely have recesses 4 for a spanner wrench. The interior wall of the blank body is tapered or coniform, as at 2, for a purpose later understood.

The blank, in the further course of manufacture, is provided on its exterior surface with a suitable screw thread 5 (Fig. 2) which may be done in any of the usual ways, as by automatic screw machines.

After the thread is cut, the body is slit or split at intervals, as at 6, the slit extending from the end opposite the shoulder or flange 3 to adjacent the same, but terminating short of the same by about one-half (preferably) the thickness of the nut 7 which cooperates with the fingers formed in the body between the slits 6.

After running the nut 7 onto the body (see dotted lines 7, Fig. 5) an arbor is passed through the body from left to right in Fig. 5, which spreads the fingers so that the inner faces thereof assume a parallel relation to the axis of the body (see Figs. 7 and 9) while the outer threaded faces thereof flare outwardly and the body assumes a generally frusto-conical form with the end of lesser diameter adjacent the nut 7. The device is now ready for use.

In applying the device, the same is slipped over the end of the hose 8, 9, 10 and the hose slipped over the nipple or pipe 11. The parts will then be positioned as shown in Fig. 9.

While holding the member 3 from turning, nut 7 is turned toward the free end of the body and the fingers will be squeezed inwardly toward the axis from the position of Fig. 9 to the position of Fig. 7.

Since the hose, composed usually of rubber 8, 10 and fabric 9, is resilient, it will be squeezed onto pipe 11 with ever increasing pressure as nut 7 is screwed outwardly. The resiliency of the hose tends to spread the fingers and consequently to cause them to engage the nut more tightly. The spreading of the fingers causes a displacement of the threads from strict alignment with one another (the displacement being greater toward the free ends of the fingers) and this, coupled with the resilient outward or counter pressure of the hose, causes a very tight engagement and more or less binding of the threads of the nut and body, which prevents jars and vibrations from loosening the nut or causing it to work toward the flange 3 again.

In practice, it is preferable to tighten the nut 7 until the outer edges of the threads 5 lie almost in a cylindrical surface (see Fig. 10), a place where a maximum squeeze is effected without running the nut too close to the edge of the body.

If desired, the inner surface of nut 7 may be slightly tapered or coniform and the threads cut into the same are then likewise somewhat inclined to the axis; the smaller end of the nut will be located adjacent the flange 3 when the nut is screwed to the position of Figs. 5 and 7. This slight taper facilitates running the nut on the inclined body threads to begin the squeeze of the fingers.

As will be seen by reference to Fig. 8, when the fingers are spread, the radii R' of the free end are centered in a circle C, the radius of which is equal to the distance that the said outer edge is spread from the initial position (Figs. 1, 2, 3 and 5) to the spread position (Figs. 7 and 9) while the radius of the nut 7 remains fixed as does also the radius R of the shouldered end of the body.

By my construction the greater binding effect is obtained near the hose end, the hose assuming the form of a wedge in longitudinal section (Fig. 10) and any fluid in the hose or pipe attempting to escape between pipe 11 and hose 10, 9, 8, will find more and more resistance as it approaches the end of the hose on pipe 11.

The outer surface of nuts 7 and flange 3 may have ordinary flats for an ordinary wrench, or they may be provided with spanner wrench recesses, or they may be circular and be operated by a strap wrench. The particular shape of the parts 7 and 3 is of no consequence and is, per se, no part of my present invention.

In this application I make no claim to the article produced by my new and improved method as that constitutes the subject-matter of my application filed Aug. 25, 1939, Ser. No. 291,966.

From the foregoing description, taken in connection with the accompanying drawing, it is thought that the complete construction, method of manufacture, and the advantages of the invention will be clear to those skilled in the art to which it relates.

What I claim is:

The method of making a hose clamp, which comprises the following steps: forming a tubular body with an outer cylindrical wall and with a flange at one end and with an inner wall tapered from the flange toward the other end, the larger diameter of the inner wall being adjacent the flange end of the body; cutting a thread in the outer cylindrical wall; slitting the body from the end opposite the flange with a plurality of slits lying in radial planes and extending to a place adjacent the flange but terminating short thereof to leave an unslit area; placing a nut on the threaded body and running it on over the unslit part of the same adjacent the flange; and finally expanding the slit part of the body to bring the inner surfaces of the slit portions of the body parallel to the axis of the body.

FRANK L. DARLING.